(12) United States Patent
Hartman (10) Patent No.: US 9,357,066 B2
(45) Date of Patent: May 31, 2016

(54) INCREASING CONTACT CENTER EFFICIENCY VIA MULTI-CAST AND MULTI-ITEM PRESENTATION

(71) Applicant: Avaya Inc., Basking Ridge, NJ (US)

(72) Inventor: Michael Hartman, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/630,084

(22) Filed: Sep. 28, 2012

(65) Prior Publication Data

US 2014/0093065 A1    Apr. 3, 2014

(51) Int. Cl.
*H04M 3/00* (2006.01)
*H04M 3/46* (2006.01)
*H04M 3/51* (2006.01)
*H04M 3/523* (2006.01)

(52) U.S. Cl.
CPC ............ *H04M 3/465* (2013.01); *H04M 3/5141* (2013.01); *H04M 3/5232* (2013.01); *H04M 3/5233* (2013.01)

(58) Field of Classification Search
CPC ..... H04M 3/5175; H04M 3/523; H04M 3/51; H04M 3/5191; H04M 3/5183; H04M 3/5233; H04M 3/5232; H04M 3/5237; H04M 3/5238
USPC .............. 379/265.01–265.02, 265.12, 265.14
See application file for complete search history.

(56) References Cited

U.S. PATENT DOCUMENTS

| | | | |
|---|---|---|---|
| 5,703,943 A * | 12/1997 | Otto | 379/265.11 |
| 6,091,811 A | 7/2000 | Chang et al. | |
| 6,359,982 B1 * | 3/2002 | Foster et al. | 379/266.06 |
| 7,003,091 B1 | 2/2006 | Burns et al. | |
| 7,787,609 B1 | 8/2010 | Flockhart et al. | |
| 2004/0240659 A1 * | 12/2004 | Gagle et al. | 379/265.01 |
| 2008/0123839 A1 * | 5/2008 | McCormack et al. | 379/265.02 |
| 2008/0196035 A1 * | 8/2008 | Davoust et al. | 718/104 |
| 2010/0266116 A1 | 10/2010 | Stolyar et al. | |
| 2013/0202100 A1 * | 8/2013 | Fagundes | 379/265.1 |

FOREIGN PATENT DOCUMENTS

WO    98/56156 A1    12/1998

OTHER PUBLICATIONS

European Search Report Received for Application No. 13185287.3, mailed on Jan. 20, 2014 (6 pages).

* cited by examiner

*Primary Examiner* — Rasha Al Aubaidi
(74) *Attorney, Agent, or Firm* — Stevens & Showalter LLP (57) ABSTRACT

A contact center includes a resource selection module operable to determine and select a plurality of agents based on a work request. The plurality of agents includes agents suitable for the work request. Further, the plurality of agents includes agents having previous work requests in a presenting state. Furthermore, the plurality of agents includes agents working below individual capacity of the agents for simultaneously handling work requests. Further, the plurality of agents is dynamic and may increase in size. The contact center further includes a resource connector module operable to present the work request simultaneously to the plurality of agents. The resource connector module further may subsequently present the work request to newly available suitable agents. The resource connector module further routes the work request to an agent based on actual agent responsiveness.

16 Claims, 4 Drawing Sheets

INCREASING CONTACT CENTER EFFICIENCY VIA MULTI-CAST AND MULTI-ITEM PRESENTATION

BACKGROUND

1. Field of the Invention

Embodiments of the present invention generally relate to contact centers and particularly to increasing contact center efficiency.

2. Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria.

In many existing systems, the criteria for servicing the contact from the moment the contact center becomes aware of the contact until the contact is connected to an agent are client or operator-specifiable (i.e., programmable by the operator of the contact center), via a capability called vectoring. Normally in present-day ACDs when the ACD system's controller detects an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. Contact center efficiency is generally measured in two ways.

Service level is one measurement of contact center efficiency. Service level is typically determined by dividing the number of contacts accepted within the specified period by the number accepted plus the number that were not accepted, but completed in some other way (e.g., abandoned, given busy, canceled, flowed out). Of course, service level definitions may vary from one enterprise to another.

Match rate is another indicator used in measuring contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents who may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Indicators ("KPIs"), such as revenue, estimated, actual, or predicted wait time, average speed of answer, throughput, agent utilization, agent performance, agent responsiveness, and the like, to calculate performance relative to their Service Level Agreements ("SLAs"). Operational efficiency is achieved when KPIs are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers.

Typically, when a new work request arrives into a contact center, an agent to work on it is selected according to the goals of the contact center. If the goal is to increase throughput and agent utilization and reduce response time on work requests, then one factor affecting this goal is the amount of time the agent takes to "accept" the work request once it is routed to them. Most contact centers allow the agent to accept or reject the work ("accepting" work is equivalent to "answering" a ringing telephone call in a traditional voice call center). The amount of time it takes the agent to realize there is new work for them, to consider the request, and to accept it, materially affects the contact center throughput and utilization goals under heavy traffic load, and therefore the quality of service provided to the work originator. This measure can be called agent responsiveness. Further, for proper utilization of agents, optimal selection of suitable agents is required.

Traditional contact centers, ACDs and workflow routers attempt to improve throughput and utilization based on historical or predicted agent responsiveness data, among other criteria. In a voice call center, for example, this is measured as "ring time." Traditional methods selecting a single agent with low historical or predicted ring time will increase the overall throughput and utilization of the contact center, in circumstances where the historical or predicted statistics are useful and meaningful; however, there are many cases where these conditions do not hold.

This is because, in the conventional methods, agent responsiveness can only be measured historically and aggregated (average, min, max) or predicted, against multiple heterogeneous past work requests. Using an historical aggregate or a statistical forecast may work to a degree, but cannot account for the actual time the agent will take on any particular new incoming contact, except after-the-fact; nor does it work for highly variable conditions that are not suitable for statistical analysis. The contact center may present work to an agent based on a historical or predicted response time of, say, 3 seconds, but the agent may currently be distracted and actually take 60 seconds to notice the screen popup, for example, and accept the new work.

The difference between the historical aggregate response time measure (average) and the actual response time is a problem for contact center customers using agent responsiveness as a routing decision, since the agent with the predicted best responsiveness may not have had the best responsiveness for this particular work request, if other agents were also offered the work. The difference may balance out with enough traffic and agents, since some agents will occasionally respond quicker than their historical or predicted response times. However, incorrect routing decisions will still occur and could be catastrophic to the service level provided to an individual caller in, for example, urgent work requests. Furthermore, use of statistical methods to measure historical responsiveness and make predictions is useful only in certain situations. Average response time is not useful if there is a high variance or uneven distribution in the individual historical responses. Predicted response time is meaningless if the factors influencing response time are not stable (for example, in the case of unpredictable interruptions to the agent's attention, or of fluctuating network latency in routing a screen popup to the agent).

Further, in the traditional contact centers, ACDs and workflow routers, it is very difficult to avoid an agent causing a delay answering a particular call, regardless of the predicted response time.

Some contact centers solve the issue of slow responding agents by using a forced call answer feature, where agent-initiated answer delay is not possible. However, this solution is not desirable in some call centers due the human reaction to perceived forced work, and subsequent human resources implications.

Further, some of the traditional systems, for example taxi dispatch systems, use radio broadcast advertising incoming work to agents, and the work is reserved for the first agent to respond. This is different than the environment of the present invention because the taxi driver may still delay start on the work by arriving late at the pickup location.

Another problem within the traditional contact centers, ACDs and workflow routers is that a work request may be presented to a suboptimal agent if a better agent is currently being presented with another work request. The better agent is traditionally considered busy while considering the presented work request and so cannot be presented with other work even if it is a better match. This leads to suboptimal throughput, utilization and service level results, since the better agent may accept the suboptimal offer being presented to them.

Some of the traditional contacts centers partially solve the issue of suboptimal agent selection due to optimal agents being ineligible while unrelated work is being presented, by allowing agents to peek at the incoming work queues, reject presenting work, and select/pull an alternative work request. This may achieve a better skill match but won't necessarily achieve a better response time and in fact may increase response times.

Yet another problem with traditional call centers occurs in the case where the better agent rejects the a presented work request, such that they would become available for the new work request, except that, in traditional contact centers, if the new work request is already being presented to a suboptimal agent, it will not be further presented to the newly available better agent.

Further, traditional call centers present the work request to only a single agent. If this agent is slow to accept the work request while another available and suitable agent may have accepted the work request if they had had a chance, then the problem of avoiding slow responders is not solved.

In some of the traditional call servers, a feature exists that involves a multi-appearance directory of numbers. This allows a call to ring on multiple telephones, and to be answered at any of them. However this has the drawback that all "appearances" of the directory numbers remain in use/busy while the current call is active, hence this is not suitable as a contact center solution.

There is thus a need for a contact center that can optimally select agents, monitor agent responsiveness in real time and route work request accordingly.

SUMMARY

Embodiments in accordance with the present invention provide a method for routing a work request to an agent in a contact center. The method includes selecting a plurality of agents based on a received work request, presenting simultaneously the work request to the plurality of agents, and routing the work request to an agent from the plurality of agents based on agent responsiveness time. The method further includes dynamically determining availability of new agents and dynamically presenting the work request to the new available agents.

Embodiments in accordance with the present invention further provide a contact center that includes a plurality of work requests and a plurality of agents servicing a subset of work requests from the plurality of work requests. The contact center further includes a resource selection module operable to determine a plurality of agents based on a work request. The contact center further includes a resource connector module operable to present the work request simultaneously to the plurality of agents. The resource selection module further operable to dynamically determine new available agents. The resource connector module is further operable to dynamically present the work item to the new available agents and route the work request to an agent from the plurality of agents based on an agent responsiveness time.

Embodiments of the present invention can provide a number of advantages depending on the particular configuration. First, embodiments of the present invention can provide an improvement in contact center throughput, agent utilization and customer service level. Further embodiments of the present invention can advantageously present a work request to all of the suitable agents simultaneously. The work request is routed to an agent whose acceptance is received first. Hence, embodiments of the present invention facilitate eliminating the possibility of the contact center inadvertently selecting a slow responding agent, which may have a historically high or predicted response rating, when a faster responding suitable agent is available. Further, embodiments of the present invention utilize actual response time as the agent selection criteria, not historical or predicted response time.

Further, embodiments of the present invention allow agents to be routed work requests even if the agent is already being presented with a work request for consideration. For example, a work request may be presented to the agent. But, it is possible the agent has not accepted the work request. Hence, actually, he is available to take the work request. Further, it may be possible that the work request may have been presented as well as accepted by the agent, yet the agent may have a capacity of handling more requests simultaneously. Embodiments of the present invention advantageously route the work request to these agents as well.

Furthermore, embodiments of the present invention facilitate presenting a work request to newly available agents, in case the presenting work has not been accepted elsewhere. For example, it may be possible, that after presenting the work request to all of the suitable agents, some more suitable agents may have logged in or have disconnected from earlier work request. Embodiments of the present invention advantageously present the work request to these agents as well.

Hence, embodiments of the present invention widen the pool of the suitable agents for the work request and simultaneously present the work request to all of the suitable agents. Further, embodiments of the present invention dynamically present call again to newly available suitable agents. Furthermore, embodiments of the present invention route the work request to an agent whose acceptance is received first. Hence, embodiments of the present invention advantageously select an agent to perform a work request based on agent responsiveness time. Further, the agent responsiveness time is based upon real time responsiveness of the agent, and is not based upon historical or predicted response time.

These and other advantages will be apparent from the disclosure of embodiments of the present invention contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments of the present invention are considered to include a tangible storage medium or distribution medium and prior art-recognized equivalents and successor media, in which the software implementations of embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

The preceding is a simplified summary of embodiments of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Embodiments of the present invention will be illustrated below in conjunction with an exemplary communication system. Although well suited for use with, e.g., a system having an ACD or other similar contact processing switch, the present invention is not limited to any particular type of communication system switch or configuration of system elements. Those skilled in the art will recognize the disclosed techniques may be used in any communication application in which it is desirable to provide improved contact processing.

Figure 1:
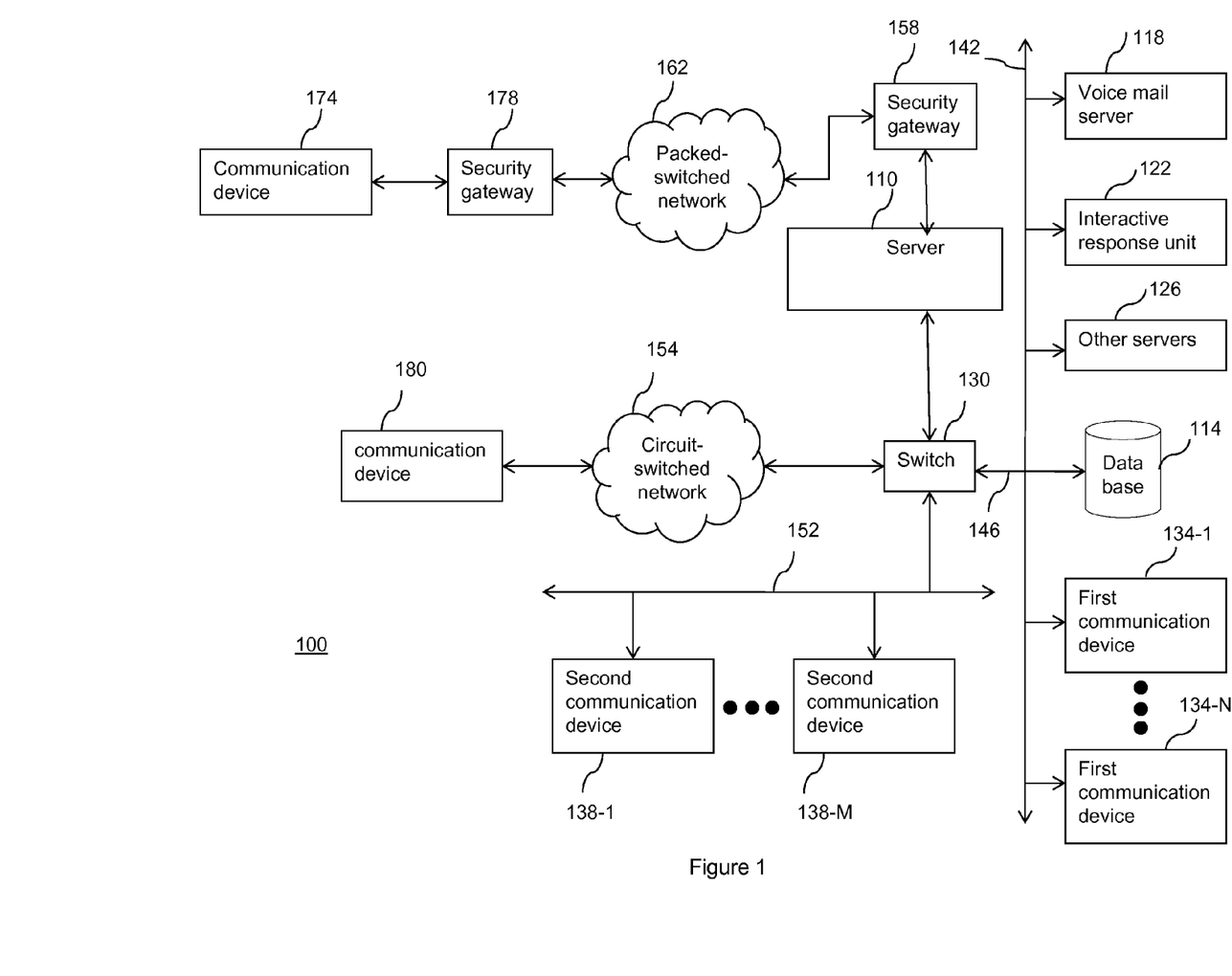
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact processing, and a plurality of servers, namely a voice mail server 118, an Interactive Response unit (e.g., IVR) 122, and other servers 126, a switch 130, a plurality of working agents operating packet-switched (first) communication devices 134-1 to N (such as computer work stations or personal computers), and/or circuit-switched (second) communication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video call software, voice messaging software, an IP voice server, a fax server, a web server, an email server, and the like. The switch 130 is connected via a plurality of trunks 150 to the Public Switch Telephone Network or PSTN 154 and via link(s) 152 to the second communication devices 138-1 to M. A gateway 158 is positioned between the server 110 and the packet-switched network 162 to process communications passing between the server 110 and the network 162.

Although the preferred embodiment is discussed with reference to a client-server architecture, it is to be understood the principles of the present invention apply to other network architectures. For example, the present invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the present invention does not require the presence of packet- or circuit-switched networks.

Figure 2:
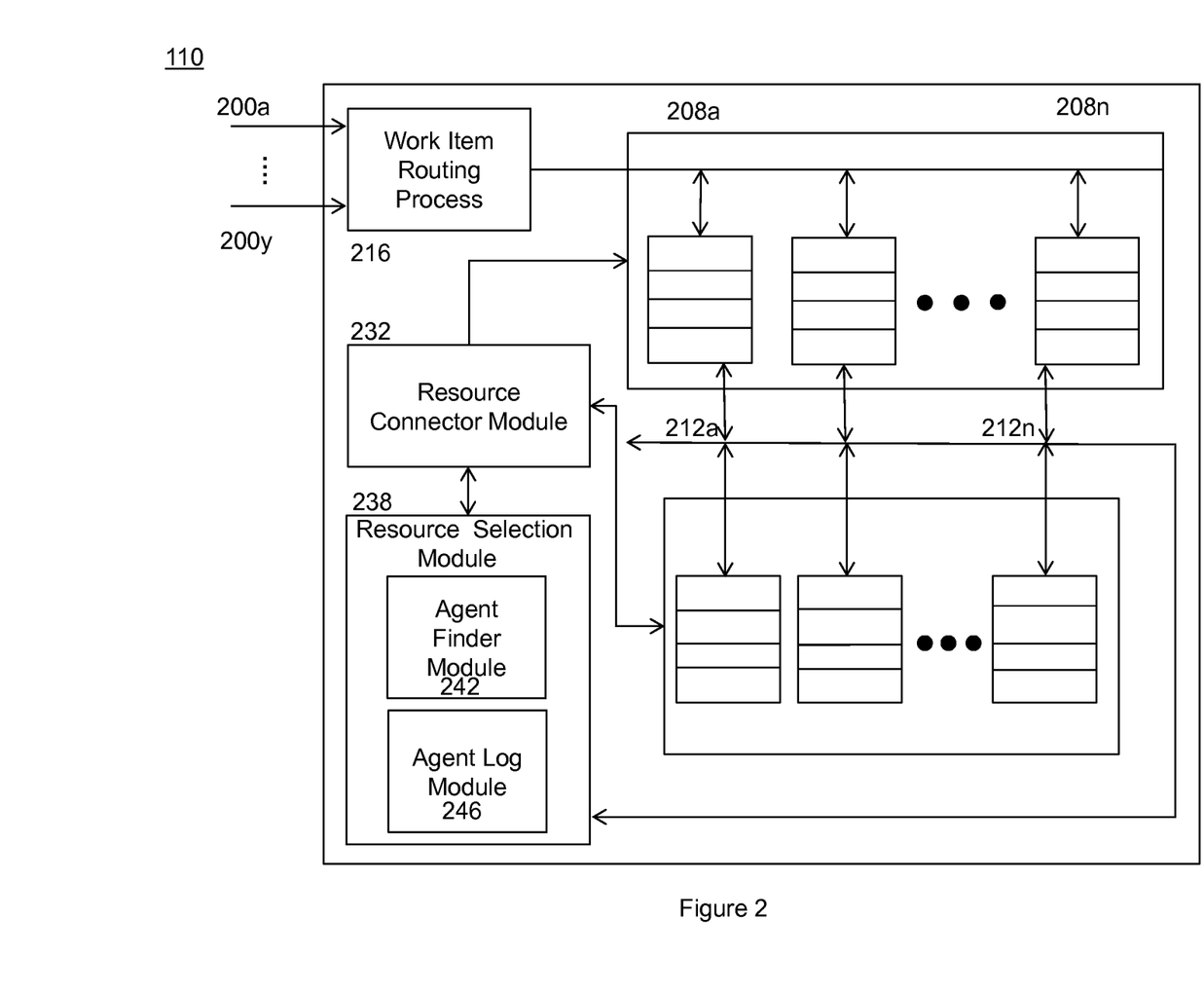
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a operational contact center reporting module (not shown), such as Avaya IQ™, CMS™, Basic Call Management System™, Operational Analyst™, and Customer Call Routing or CCR™ by Avaya, Inc., gathers call records and contact-center statistics for use in generating contact-center reports.

The switch 130 and/or server 110 can be any architecture for directing contacts to one or more communication devices. In some embodiments, the switch 130 may perform load-balancing functions by allocating incoming or outgoing contacts among a plurality of logically and/or geographically distinct contact centers. Illustratively, the switch and/or server can be a modified form of the subscriber-premises equipment sold by Avaya Inc. under the names Definity™ Private-Branch Exchange (PBX)-based ACD system, Multi-Vantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

As can be seen in FIG. 2, included among the data stored in the server 110 is a set of contact pools 208a-n and a separate set of agent pools 212a-n. The contacts may be directed to particular suitable agents or a pool of suitable agents, based upon certain criteria. Alternatively the contacts may be prioritized in individual ones of the contact pools 208a-n in their order of priority in different ones of a plurality of contact pools that correspond to a different priority. Likewise, each agent's pools are prioritized according to his or her suitability, and either agents are pooled in individual ones of agent pools 212a-n in their order of suitability or are pooled in different ones of a plurality of agent pools 212a-n that correspond to a pool and each one of which corresponds to a different suitable criteria.

Included among the control programs in the server 110 is a work item routing process 216. Contacts incoming to the contact center are assigned by work item routing process 216 to different contact pools 208a-n based upon a number of predetermined criteria, including but not limited to customer identity, customer needs, contact center needs, current contact center wait lengths, customer value, and the agent skill that is required for the proper handling of the contact. Agents who are available for handling contacts are assigned to agent pools 212a-n based upon the suitability they possess. An agent may have multiple criteria that suits the needs of several contacts, and hence may be assigned to multiple agent pools 212a-n simultaneously. Furthermore, an agent may have different levels of expertise (e.g., levels 1-N in one configuration or merely primary levels and secondary levels in another configuration), and hence may be assigned to different agent pools 212a-n at different expertise levels.

In one configuration, the contact center is operated by a contract operator, and each of the contact pools 208a-n, and possibly each of the agent pools 212a-n, corresponds to a different client. Each client can have a separate service level agreement or other type of performance measurement agreement with the contract operator regarding performance expectations, goals, requirements or specifications for the client's respective pool(s).

Referring again to FIG. 1, the gateway 158 can be Avaya Inc.'s, G700 Media Gateway™ and may be implemented as hardware such as via an adjunct processor (as shown) or as a chip in the server.

The first communication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second communication devices 138-1, . . . 138-M are circuit-switched. Each of the communication devices 138-1, . . . 138-M corresponds to one of a set of internal extensions Ext1, . . . ExtM, respectively. The second communication devices can include, for example, wired and wireless telephones, PDAs, H.320 videophones and conferencing units, voice messaging and response units, traditional computer telephony adjuncts, and any other communication device.

It should be noted that embodiments of the present invention do not require any particular type of information transport medium between switch or server and first and second communication devices, i.e., embodiments of the present invention may be implemented with any desired type of transport medium as well as combinations of different types of transport channels.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with a first communication device 174 via a gateway 178, and the circuit-switched network 154 with an external second communication device 180.

In a preferred configuration, the server 110, network 162, and first communication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user communication devices, and other elements as shown in FIG. 1 is for purposes of illustration only and should not be construed as limiting the present invention to any particular arrangement of elements.

According to at least one embodiment, a resource connector module 232 and a resource selection module 238 are provided. The resource connector module 232 and resource selection module 238 are stored either in the main memory or in a peripheral memory (e.g., disk, CD ROM, etc.) or some other computer-readable medium of the center 100.

The resource connector module 232 monitors the occupants of the work item and agent pools 208*a-n* and 212*a-n*, respectively, and contact center objectives, rules, and policies and assigns agents to service work items. As will be appreciated, the central server 110 is notified via LAN 142 of an incoming contact by the communications component (e.g., switch 130, fax server, email server, web server, and/or other server) receiving the incoming contact. The incoming contact is held by the receiving communications component until the resource connector module 232 forwards instructions to the component to forward or route the contact to a specific contact center resource, such as the interactive response unit 122, the voice mail server 118, and/or first or second communication device 134, 138 associated with a selected agent.

The module 232 distributes and connects these contacts to communication devices of available agents based on the predetermined criteria noted above. According to an embodiment of the present invention, the resource connector module 232 may simultaneously present a contact to multiple or a plurality of suitable agents. When the resource connector module 232 forwards a contact to the plurality of agents, the module 232 also forwards customer-related information from databases 114 to the agent's computer work station for previewing and/or viewing (such as by a pop-up display) to permit the agent to better serve the customer. The plurality of suitable agents process the contacts sent to them by the module 232.

The resource selection module 238 receives contact center operational information (such as total agents available), analyzes the information, and provides the results to contact center administrators. The resource selection module 238 includes an agent finder module 242 that, based upon real time operational information, determines suitable agents for a received work request. According to an embodiment of the present invention, the suitable agents include agents who already have been presented a work request, but have not accepted it. Further, the suitable agents include agents who already have been presented and accepted some work request, but have not reached their full capacity of handling simultaneous work requests.

The resource selection module 238 further includes an agent log module 246 that dynamically determines new available suitable agents. In case, the received work request has not been accepted by any earlier agent, the agent log module 246 is configured to detect availability of new suitable agents. For example, some suitable agents may just have logged in or some suitable agents may just have disconnected a previous work request, or an under-capacity agent may reject a presenting work request even while other work remains presenting to them.

Figure 3A:
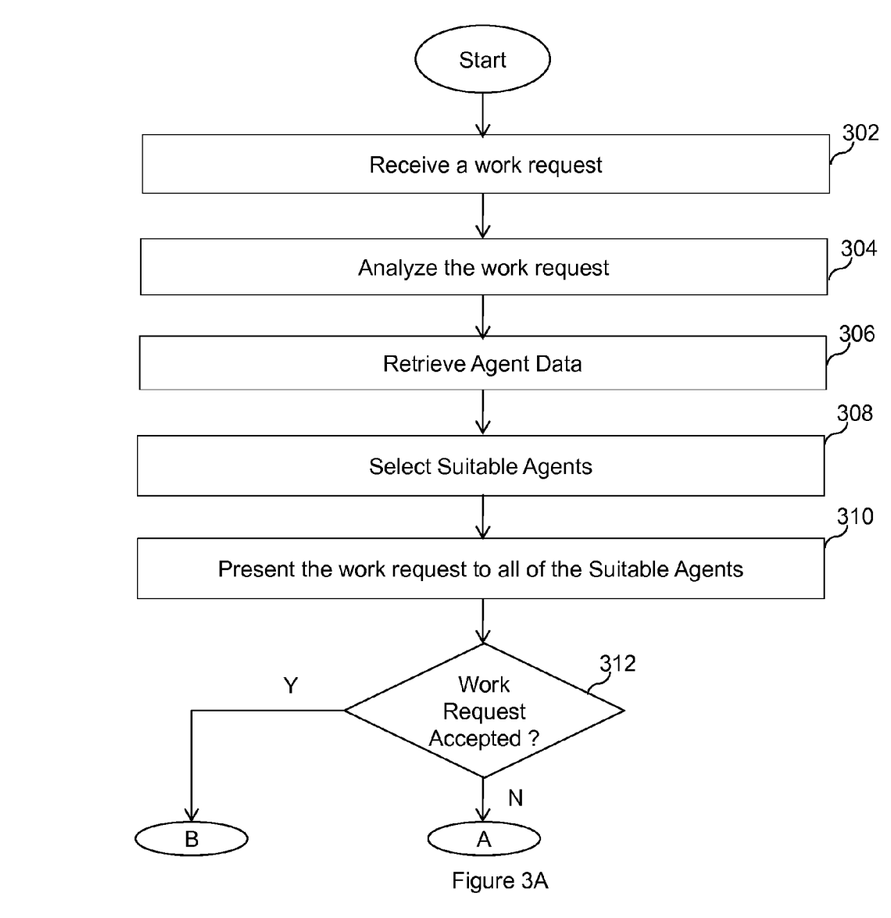
FIGS. 3A and 3B are collectively depicting an embodiment of the present invention.
Figure 3B:
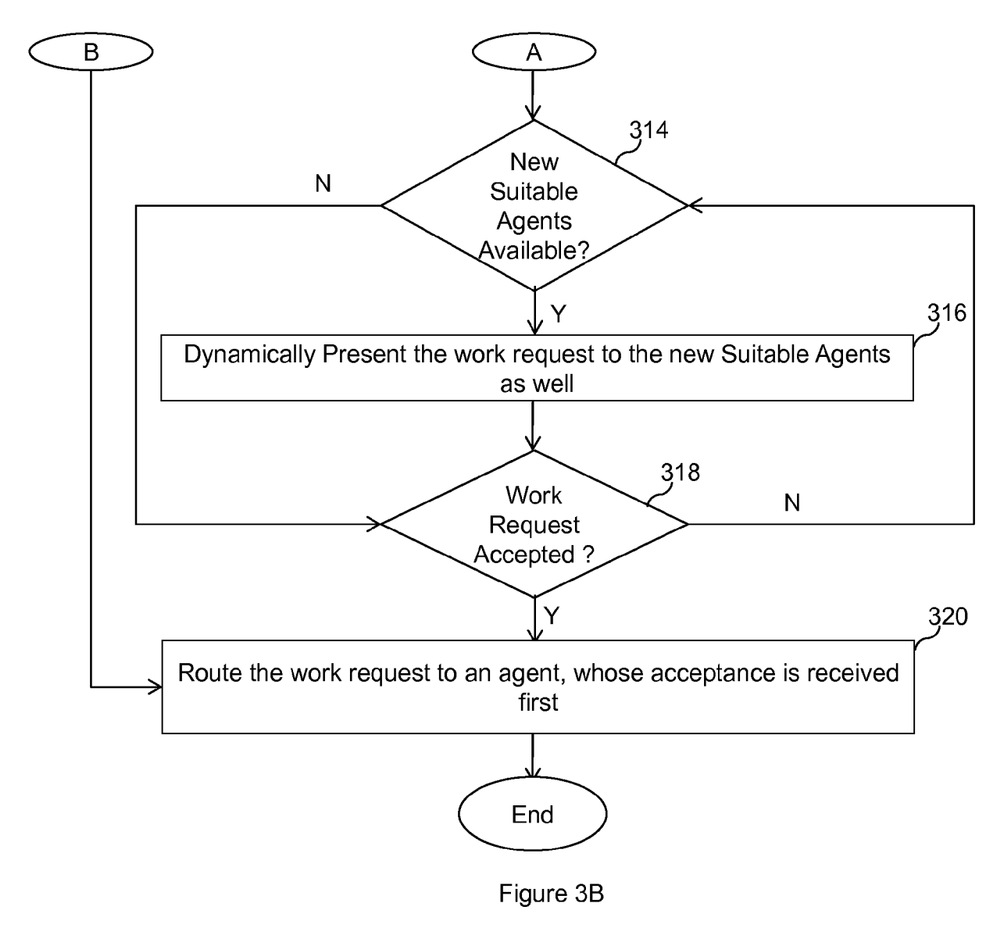

The operation of the resource connector module 232 and the resource selection module 238 including the agent finder module 242 and the agent log module 246, will now be discussed with reference to FIGS. 3A and 3B. FIGS. 3A and 3B illustrate a method 300 for routing a work request or work item to an agent in the contact center 100.

In step 302, the resource connector module 232 may receive a work request. The work request may come from a contact that requires some service from an agent. In an embodiment, the work request may be received by the resource connector module 232. In another embodiment, the work request may be received by the receiving communication component (not shown in the figure).

In step 304, the resource selection module 238 may analyze the work request to determine a type of work request. In an embodiment, the work request may be analyzed to know more about exact requirement of the work request. In another embodiment, the work request may be analyzed to know from which particular client the work request belongs to. In an embodiment, the resource selection module 238 may analyze the work request to determine a type of work request. In another embodiment, some other module, for example, the receiving communication component (not shown in the figure) may analyze the work request.

In step 306, the resource selection module 238 may retrieve relevant data. In an embodiment, the relevant data may be retrieved from the database 214. In another embodiment, the relevant data may be retrieved by the operational contact center reporting module. The relevant data may include historical as well as real time operational data from the operational contact center reporting module. The operational data generally includes not only historic KPI values but also current (real time) operational data for the contact center. The current operational data is determined by a real time event processing module of the operational contact center reporting module.

In step 308, the agent finder module 242 of the resource selection agents 238 selects a plurality of suitable agents for the work request. A suitable agent may be an agent that is not already actively handling work already accepted, or already handling work but able to handle work simultaneously and not yet at the maximum simultaneous capacity. Further, "suitable" may also include any additional eligibility criteria required by the customer's business, such as agent fairness criteria (idle time, for example), and skill matching.

In an embodiment, the plurality of suitable agents includes agents having skills matching to the work request. Further, according to an embodiment of the present invention, the plurality of agents also includes agents having previous work items in a presenting state. Some agents may have been provided other work requests, but has not started work on those work requests or has not accepted those work requests. For example, if an agent has been provided a phone call, but the agent has not answered it for some reason, then another phone call may also be forwarded to the agent. Furthermore, according to an embodiment of the present invention, the plurality of agents includes agents working at a capacity below maximum individual capacity of the agents for simultaneously handling a plurality of work requests. For example, some agents may handle multiple work requests simultaneously. In one embodiment, the suitable agents may include agents who have been provided other work requests and also have accepted some of them, but not operating at their maximum capacity of simultaneously handling multiple work requests. The agent finder module 242 may filter out the suitable agents and unsuitable agents.

In step 310, the resource connector module 232 simultaneously presents the work request to all of the suitable agents. Those skilled in the art will appreciate that the suitable agents may be presented the work request in an appropriate form including a bearer channel, and the agent's terminal device. In one embodiment, a screen popup to the suitable agent may indicate the work request. In another embodiment, a ringing to the suitable agent may indicate the work request.

In step 312, the resource connector module 232 determines whether work request has been accepted or not. If the work request has been accepted by some suitable agent, the resource connector module 232 routes the work request to the agent from the plurality of agents whose acceptance is received first by the resource connector module. Otherwise, the method 300 proceeds to 314.

In step 314, the agent log module 242 of the resource selection module 238 dynamically determines whether new suitable agents have been available to take the work request. In an embodiment, some suitable agents may just have logged in or some suitable agent may just have disconnected or completed an earlier work request, after the resource connector module 232 presented the work item to the plurality of agents. Further, some agent may have been operating below his maximum capacity of handling simultaneously multiple work requests. In an embodiment, the agent log module 242 automatically determines availability of new suitable agents to handle the work request. If no new suitable agents have been available since the work request was presented to the suitable agents, the method goes to 318. If new suitable agent/agents have become available, the method proceeds to 316.

In step 316, the resource connector module 232 dynamically presents the work request to the new found suitable agents. In an embodiment, the new found suitable agents are presented with the work request in addition to the previously presented work request to the plurality of agents. In an embodiment, the resource connector module 232 may automatically presents the work request to the new available agents.

In step 318, the resource connector module may determine whether the work request has been accepted. If the work request is not accepted by any agent yet, the method returns to 314. Otherwise, if the work request has been accepted by any agent the method 300 proceeds to 320.

In step 320, the resource connector module 232 may route the work request to the agent from the plurality of agents and the new available agents based on agent responsiveness time. The agent responsiveness time is a measure of responsiveness of the agent in real time for the work request. In one embodiment, the work is routed to the agent, whose acceptance is received first by the resource connector module 232. Those skilled in the art will appreciate that that one of the new available agents may also handle the work request, if his acceptance is received first by the resource connector module 232.

Further, the work request may be removed from a presenting status from rest of the plurality of agents. Furthermore, the resource selection module 238 may determine whether the agent who accepted work request, is operating at his maximum capacity. If the agent is operating at his maximum capacity, any other work requests presenting at this agent are now removed from this agent. These remain presenting at other agents, if they were already presenting. If the agent is not operating at his maximum capacity, the resource selection module may consider the agent to be available to take more work request.

The module 238 presents the subset of recommendations to an administrator or automatically selects the "best" recommendation.

The agent finder module 242 and the agent log module 246, or the resource selection module 238 provides the subset of recommendations to the work item routing process 216 and/or resource connector module 232 for implementation.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device. It will also be appreciated that the plurality of agents and the contacts may be organized or processed internally as queues, pools, or any other mechanism.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of the present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the present invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of the present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above.

This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer-implemented method for routing a work request to an agent within a call center, the method comprising:

determining, by a processor, operating capacities of agents within an agent pool;

selecting, by the processor, for a received work request, a plurality of agents of the agent pool based on the operating capacities of the agents of the agent pool and a required skill set for the received work request, each of the plurality of agents associated with a respective agent communication device;

presenting, by the processor, simultaneously in queues accessible by agent communication devices associated with the plurality of agents, the work request;

updating, by the processor, the selection of the plurality of agents after presenting the work request;

routing, by the processor, the work request to a select agent communication device associated with an agent from the plurality of agents based on an agent responsiveness time, wherein the agent responsiveness time comprises time duration in which an acceptance of the work request is received from the select agent communication device;

redetermining, by the processor, the operating capacity for the agent to whom the work request is sent; and removing, by the processor, any other work orders presented to the queue associated with the agent to whom the work request is sent if the operating capacity for the agent exceeds a threshold.

2. The method of claim 1, further comprising dynamically determining availability of new agents.

3. The method of claim 2, wherein dynamically determining availability of new agents comprises dynamically determining agent communication devices logged in or disconnected from previous work requests after the work request is presented.

4. The method of claim 2, further comprising dynamically presenting the work request to queues associated with the new available agents.

5. The method of claim 4, further comprising routing the work request to queues associated with the new available agents based on the agent responsiveness time.

6. The method of claim 1, further comprising removing the work request from queues associated with the rest of the plurality of agents.

7. The method of claim 1, further comprising determining the agent responsiveness time as a measure of responsiveness of the agent in real time for the work request.

8. A contact center, comprising:
a server comprising a processor coupled to memory, wherein the processor executes program code stored in the memory to:
  select, for a work item of a plurality of work items, agents from an agent pool based on operating capacities of the agents and a required skill set for the work item;
  present the work item simultaneously to queues associated with a plurality of agents; and
  route the work item to an agent processing device associated with an agent from the pool of agents based on an agent responsiveness time, wherein the agent responsiveness time comprises time duration in which an acceptance of the work item is received from the agent processing device;
  determine operating capacities of the agents within the agent pool before the work item is routed to the agent processing device;
  redetermine the operating capacity for the agent to whom the work item is sent to the associated agent processing device; and
  remove any other work orders presented to the queue associated with the agent to whom the work item is sent if the operating capacity for the agent exceeds a threshold.

9. The contact center of claim 8, wherein the server is further configured to dynamically determine new available agents.

10. The contact center of claim 9, wherein the newly available agents comprise agents associated with agent processing devices logged in or disconnected from previous work items after the server presents the work item.

11. The contact center of claim 8, wherein-the server is configured to dynamically present the work item to the queue associated with new available agents.

12. The contact center of claim 11, wherein the server is configured to route the work item to the agent processing device associated with the agent from the plurality of agents and the newly available agents based upon the agent responsiveness time.

13. A contact center, comprising:
a server comprising a processor coupled to memory, wherein the processor executes program code stored in the memory for:
determining operating capacities of agents within an agent pool;
  selecting, for a received work request, a plurality of agents of the agent pool based on the operating capacities of the agents and a required skill set for a selected work request of the work requests;
  presenting, simultaneously in queues associated with the plurality of agents, the selected work request;
  updating the selection of the plurality of agents after presenting, simultaneously in queues associated with the plurality of agents, the selected work request;
  routing the selected work request to an agent processing device associated with an agent from the plurality of agents based on an agent responsiveness time, wherein the agent responsiveness time comprises time duration in which an acceptance of the selected work request is received from the agent;
  redetermining the operating capacity for the agent to whom the work request is sent; and
  removing any other work orders presented to the queue associated with the agent to whom the work request is sent if the operating capacity for the agent exceeds a threshold.

14. The contact center of claim 13, wherein the server is further configured to dynamically determine new available agents for the work request.

15. The contact center of above claim 14, wherein the server is further configured to dynamically present the work request to queues associated with the new available agents.

16. The contact center of claim 13, wherein the agent responsiveness time is a measure of responsiveness the agent in real time for the work request.

* * * * *